United States Patent

Nilsson

[15] 3,699,823
[45] Oct. 24, 1972

[54] DEVICE FOR RE-CIRCULATING THE BALLS OF A BALL SCREW MECHANISM

[72] Inventor: Sven Walter Nilsson, Partille, Sweden

[73] Assignee: SKF Industrial Rading and Development Company N.V., Amsterdam, Netherlands

[22] Filed: Jan. 19, 1971

[21] Appl. No.: 107,655

[30] Foreign Application Priority Data

Jan. 20, 1970   Sweden ............620170/1970

[52] U.S. Cl. .................................................74/459
[51] Int. Cl. .............................................F16h 55/04
[58] Field of Search .....................24/459, 424.8 R

[56] References Cited

UNITED STATES PATENTS 2,343,507   3/1944   Hoffar ..........................74/459
3,327,551   6/1967   Prueter ....................74/459 X

*Primary Examiner*—Leonard H. Gerin
*Attorney*—Howson & Howson

[57] ABSTRACT

In a ball nut mechanism the ball return means for recirculating the balls from one end of the mechanism to the other is designed as a tube which is substantially U-shaped, the end portions of the tube being fitted in bores in the nut body of the mechanism. The tube furthermore is countersunk in a channel running transversally over the nut body between said bores. On a level above the tube resting in the channel, this is provided with a longitudinal groove in each of its side walls, in which grooves a locking member is insertable. Said locking member, being of a deformable material, is so much longer than the channel that it extends out over enlarged portions of the bores, where it is bent down over the tube, thereby being secured against longitudinal displacement.

3 Claims, 3 Drawing Figures

INVENTOR:
SVEN WALTER NILSSON

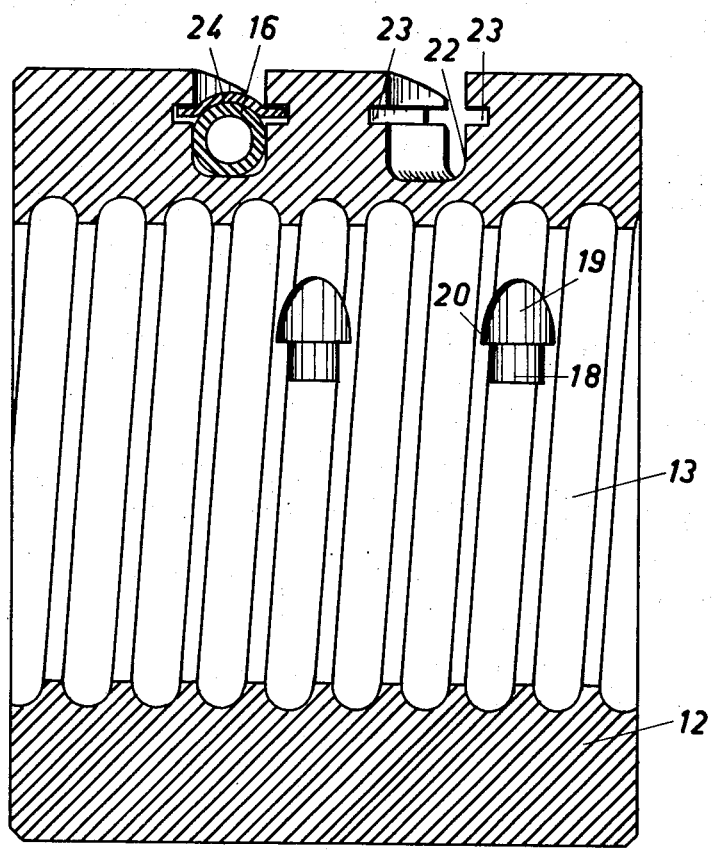

DEVICE FOR RE-CIRCULATING THE BALLS OF A BALL SCREW MECHANISM

BACKGROUND OF THE INVENTION

Ball screw mechanisms are provided with a device for recirculating the balls comprising one or more ball return means arranged at an angle against the longitudinal axis of the nut part and fitted in bores arranged in the nut in suitable way so that the ball return means which often is designed as a tube will contact the desired parts of the ball track between nut and screw.

The nut generally consists of a cylindrical body and the portion thereof at which the ball return tube or tubes respectively are to be fitted generally is planed so that the portion of the ball return tube forming the base of for instand a U-shaped structure may engage the nut body smoothly. This planing of the nut body, however, causes a marked reduction of its strength which implies that the nut body easily may break at the portion having the thinnest material. The ball return tube furthermore is completely unprotected and the slightest damage may cause such a deformation of the tube that the passage of the balls therethrough may be jeopardized.

SUMMARY OF INVENTION

The present invention refers to a device for obtaining a protected position for the ball return tube, the strength of the nut body thereby being only slightly reduced.

Instead of completely planing one side of the nut part the smallest number of millings necessary for the ball return tube are made, said tubes thereby in assembled state being completely encased in the nut body thereby having a very protected location.

BRIEF DESCRIPTION OF THE DRAWINGS

FIGS. 1–3 show an embodiment of the invention.

DESCRIPTION OF THE PREFERRED EMBODIMENT

Figure 1:
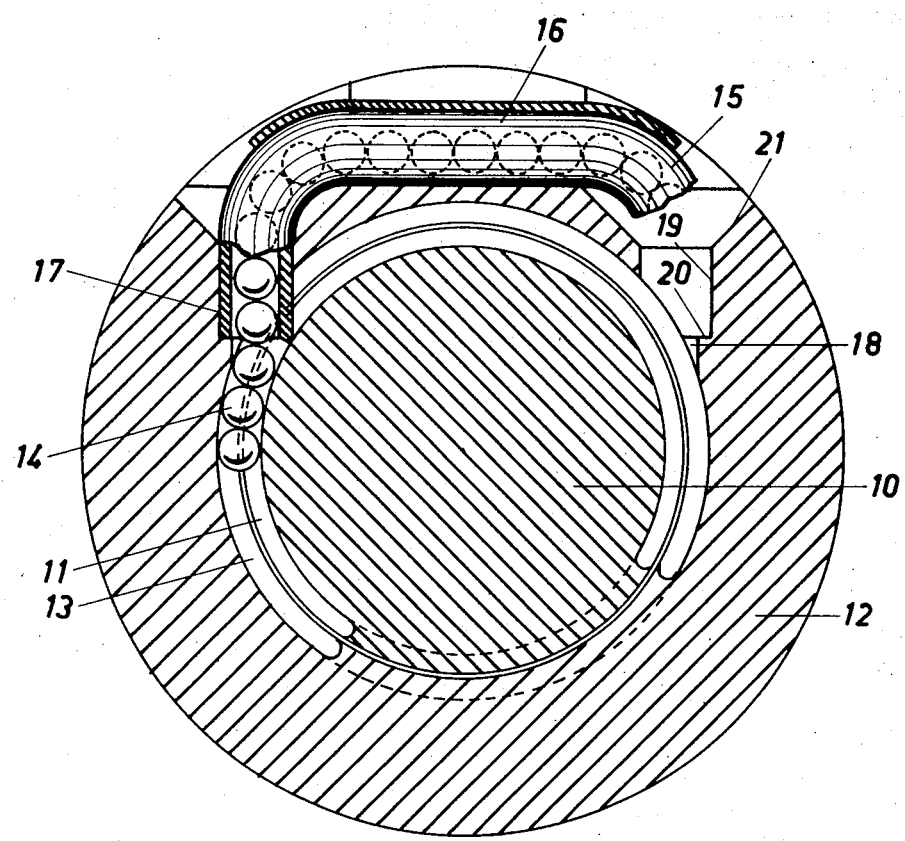

The mechanism shown in the drawings comprises in known manner a screw 10 provided with a helical groove 11 and a nut part 12, in this case being substantially cylindrical and provided with an internal groove 13 corresponding to the groove 11 of the screw. Each groove is substantially semicircular in cross-section and the grooves form together a track for a large number of balls 14 which act as transmitting members between screw and nut. As the nut travels along the screw the balls must be transferred from one end portion of the nut to the other. In the present case the transfer is carried out by means of two ball return tubes 15. These tubes are substantially U-shaped having a straight base portion 16 and two end portions 17 located at substantially right angles against the base portion and merging into this along smoothly curved portions.

The end portions of the ball return tubes are intended to be fitted in bores in the nut body in such a manner that the tubes will be located straddled over a desired number of pitchs of the helical track formed by the grooves 11 and 13. As can be seen from the right hand part of FIG. 1 the center line of each bore is directed substantially tangentially against the inner of the grooves and comprises a first portion 18 having a diameter corresponding to the inner diameter of the ball return tube which is equal to the diameter of the balls, and a somewhat wider portion 19 having the same diameter as the outer diameter of the tube. Thereby a step 20 is formed against which the end of the tube rests in assembled state. The ends of the bores turned outwardly away from the groove are conically countersunk as shown at 21.

As can be seen from the left hand part of FIG. 1 the tube end which is provided with a catching tongue will extend into the ball track in such a way that it will catch the balls and urge them into the tube. In order to facilitate fitting of the ball return tubes in the protected position in the nut body two channels 22 are formed in the nut, said channels extending transversally over the nut body between two bores. In each side wall of these channels there is arranged a longitudinal groove 23 in which grooves a locking member in the form of a block may be inserted.

The term "locking block" may here be understood as a plate-formed member of any appropriate material such as metal, plastics, or the like.

The channel has a width corresponding to the outer diameter of the ball return tube and a depth so much larger than this that the tube will be countersunk below the outer contour of the nut body, the tube thereby having a completely protected location. In spite of the fact that two channels have been made transversally over the nut body the strength of this will be reduced at a lower degree than the case where the nut body is planed in the manner hitherto generally used.

The locking member 24 is longer than the channel and its ends thereby in assembled state will extend into the enlarged portions of each bore. Two grooves 23 are arranged at a suitable level above the bottom of the channel in such a manner that the locking member may be pushed in from the side of any of the bores, whereupon it is possible to bend the ends of the locking member down over the curved portions of the ball return tube so that the locking member is secured against longitudinal displacement.

Figure 2:
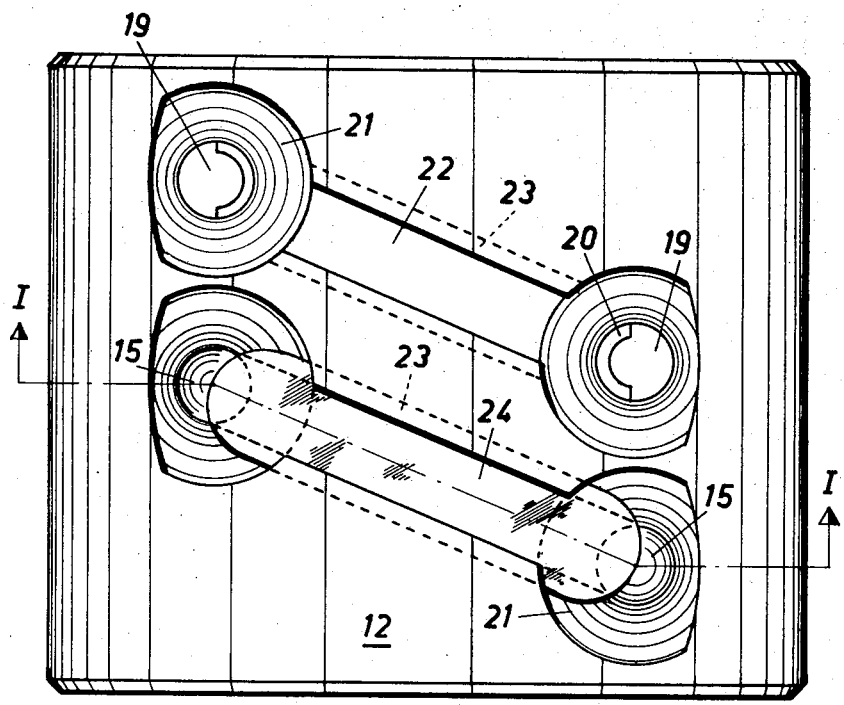

FIG. 2 shows in its upper part the channels and the bores without ball return tube and locking member and in its lower part having said members in assembled state.

What is claimed is:

1. A device for recirculating the balls of a ball screw mechanism in which the ends of a ball return means are fitted in bores in the nut body of the mechanism and directed against the ball track, and in which a ball return channel is arranged between said bores, CHARACTERIZED THEREBY that the ball return means consists of an in itself known substantially U-shaped tube which is countersunk in said channel which has a width corresponding to the outer diameter of the ball return tube and a depth at least corresponding to this, a longitudinal groove arranged in each side wall of said channel and a locking member of a deformable material which may be fitted in said grooves, said locking member being adapted to be pushed into the channel outside the ball return tube upon the fitting of this in the channel.

2. A device according to claim 1, CHARACTERIZED THEREBY that each bore has a conically enlarged portion at its outer portion and that the locking member is so much longer than the channel that it extends into the two enlarged portions of the bores and there are bent down along the ball return tube thereby preventing an unattempted longitudinal displacement of the locking member from its assembled position.

3. A device according to claim 1, CHARACTERIZED THEREBY that the longitudinal grooves in the channel are arranged closer to the bottom of the channel and that the locking member is formed with a U-shaped cross section.

* * * * *